(12) United States Patent
Bhandari et al.

(10) Patent No.: US 12,361,134 B2
(45) Date of Patent: Jul. 15, 2025

(54) SECURE LAUNCH FOR A HYPERVISOR

(71) Applicant: Microsoft Technology Licensing, LLC, Redmond, WA (US)

(72) Inventors: Aditya Bhandari, Seattle, WA (US); Bruce J. Sherwin, Jr., Woodinville, WA (US); Luis Hernandez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 15/875,891

(22) Filed: Jan. 19, 2018

(65) Prior Publication Data
US 2019/0087580 A1 Mar. 21, 2019

Related U.S. Application Data

(60) Provisional application No. 62/560,563, filed on Sep. 19, 2017.

(51) Int. Cl.
*G06F 21/57* (2013.01)
*G06F 9/455* (2018.01)
*G06F 21/51* (2013.01)
*G06F 21/60* (2013.01)

(52) U.S. Cl.
CPC ........ *G06F 21/575* (2013.01); *G06F 9/45558* (2013.01); *G06F 21/51* (2013.01); *G06F 21/602* (2013.01); *G06F 2009/45587* (2013.01)

(58) Field of Classification Search
CPC ...... G06F 21/575; G06F 21/51; G06F 21/602; G06F 2009/45587; G06F 9/45558
See application file for complete search history.

(56) References Cited

U.S. PATENT DOCUMENTS

| | | | |
|---|---|---|---|
| 7,996,836 B1 | 8/2011 | McCorkendale et al. | |
| 8,127,292 B1 | 2/2012 | Dobrovolskiy et al. | |
| 9,032,400 B1 * | 5/2015 | Thomas | G06F 11/008 718/1 |
| 2008/0126779 A1 | 5/2008 | Smith | |
| 2009/0164770 A1 * | 6/2009 | Zimmer | G06F 21/51 713/2 |
| 2009/0249053 A1 * | 10/2009 | Zimmer | G06F 21/575 713/2 |

(Continued)

FOREIGN PATENT DOCUMENTS

EP 3166037 A1 5/2017

OTHER PUBLICATIONS

"International Search Report and Written Opinion Issued In PCT Application No. PCT/US18/038879", Mailed Date: Oct. 26, 2018, 25 Pages.

(Continued)

*Primary Examiner* — Wissam Rashid

(57) ABSTRACT

This disclosure generally relates to securely launching a hypervisor and subsequently validating that the hypervisor was securely launched. As is described herein, once a hypervisor has been initialized or has otherwise launched, a verification operation is performed. The verification operation may be used to ensure that the hypervisor was securely launched. When it is determined that the hypervisor was securely launched, one or more platform details are obtained. These platform details may then be stored in a memory device.

20 Claims, 10 Drawing Sheets

(56) References Cited

U.S. PATENT DOCUMENTS

| | | | |
|---|---|---|---|
| 2012/0226903 | A1 | 9/2012 | Durham et al. |
| 2013/0318595 | A1* | 11/2013 | Wang ................. G06F 21/44 726/16 |
| 2014/0208123 | A1 | 7/2014 | Roth et al. |
| 2014/0258700 | A1* | 9/2014 | England ............ G06F 21/572 713/2 |
| 2015/0213269 | A1 | 7/2015 | Zimmer et al. |
| 2015/0317495 | A1 | 11/2015 | Rodgers et al. |
| 2016/0357988 | A1 | 12/2016 | Ferguson et al. |
| 2017/0132014 | A1 | 5/2017 | Sutton et al. |
| 2017/0185776 | A1 | 6/2017 | Robinson et al. |
| 2018/0032734 | A1* | 2/2018 | Gunti ................. G06F 21/575 |
| 2018/0239896 | A1* | 8/2018 | Kato ................ G06F 9/45558 |

OTHER PUBLICATIONS

Zhang, et al., "Security verification of hardware-enabled attestation protocols", In Proceedings of the 45th Annual IEEE/ACM International Symposium on Microarchitecture Workshops, Dec. 1, 2012, pp. 47-54.

"Office Action Issued in European Patent Application No. 18746041.5", Mailed Date: Mar. 22, 2022, 8 Pages.

Communication under Rule 71(3) EPC Received for European Application No. 18746041.5, mailed on Jun. 25, 2024, 08 pages.

Communication under Rule 71(3) received in European Application No. 18746041.5, mailed on Feb. 13, 2024, 8 pages.

Partial European Search Report Issued in European Patent Application No. 24208892.0, mailed on Jan. 31, 2025, 16 Pages.

Extended European Search Report Issued in European Patent Application No. 24208892.0, mailed on Apr. 23, 2025, 13 Pages.

Communication pursuant to Rules 70(2) and 70a(2) Received in European Patent Application No. 24208892.0, mailed on May 26, 2025, 02 pages.

\* cited by examiner

SECURE LAUNCH FOR A HYPERVISOR

CROSS-REFERENCE TO RELATED APPLICATIONS

This application claims priority to U.S. Provisional Patent Application No. 62/560,563 entitled, "Secure Launch for a Hypervisor" and filed on Sep. 19, 2017, the entire disclosure of which is hereby incorporated by reference in its entirety.

BACKGROUND

Virtualization of hardware platforms is becoming more and more common. In a virtualized system, a virtual machine, that acts like a real computing device, is created. For example, a host machine is a physical computing device on which the virtualization takes place. A guest machine is the virtual machine. In some cases, the host machine includes a hypervisor that is used to create and manage a virtual machine. As the hypervisor may be responsible for creating one or more guest machines, it is imperative that the hypervisor be launched securely.

It is with respect to these and other general considerations that examples have been described. Also, although relatively specific problems have been discussed, it should be understood that the examples should not be limited to solving the specific problems identified in the background.

SUMMARY

This disclosure generally relates to hypervisors that are used to create one or more virtual machines or guest machines. In order to ensure that the hypervisor, and its associated information, is not compromised thereby compromising the virtual machines created by the hypervisor, the hypervisor may undergo a secure launch process. For example, the hypervisor, or a secure hypervisor loader, may be authenticated and be configured to execute before any other non-secure code is executed. The secure launch described herein may also act to protect the hypervisor itself as well as the operating system of the host machine on which the hypervisor executes.

In addition, or as an alternative to the above, any hardware on which the hypervisor is executing or is otherwise associated with may be configured to support and/or establish a hardware-based root of trust for the hypervisor. In some cases, the root of trust may be established even after any non-secure code has been executed by the hardware.

Additionally, the hypervisor may be configured to securely retrieve platform details as it is being securely launched. These platform details may include, among others, how to start or reset a logical processor; how to interact with input-output memory management units (IOMMUs), memory management units (MMUs), timers, interrupt controllers and interrupt remapping hardware associated with the hardware; how to shutdown, restart or reboot the system; what the memory map looks like; how to cause a zeroing of some or all memory on a shutdown or reboot of the system; how to enter processor and system-wide low level power states and the like.

Accordingly, described herein is a method for validating that a hypervisor was securely launched. In some instances, the method includes initializing a hypervisor. Once the hypervisor has been initialized, a verification operation is performed. The verification operation may be used to ensure that the hypervisor was initialized securely. When it is determined that the hypervisor was initialized securely, one or more platform details are obtained. Those platform details may then be stored in a memory device.

The present disclosure also describes a method for securely launching a hypervisor. The method includes accessing binary code associated with the hypervisor and validating at least one security credential associated with the binary code. In some instances, the security credential is specified by a manufacturer of the binary code. Once the securing credential has been validated, the binary code may be executed.

The present application also discloses a system that includes at least one processor and a memory coupled to the at least one processor and storing instructions that, when executed by the at least one processor, perform a method for validating that a hypervisor has been securely launched. In some instances, the system stores a decryption key in a secure memory location. Verification is then provided to the system that indicates that one or more expected measurements have been met during a hypervisor launch process. When it is determined that the one or more expected measurements have been met, access to the decryption key is enabled.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a secure launch process for a hypervisor that creates and runs one or more virtual machines. The process described herein may also be used to guarantee the integrity of the hypervisor and ensure that the hypervisor hasn't been replaced with a malicious hypervisor.

In previous solutions, a Unified Extensible Firmware Interface (UEFI) (that defines a software interface between an operating system and firmware of the platform) was typically used and trusted to securely launch a hypervisor. However, the solution described herein does not rely solely on the UEFI code base and as such, provides a more secure way to launch a hypervisor.

For example and as will be described in more detail below, the secure launch process described herein enables a platform on which the hypervisor is launched to verify the integrity of the hypervisor. Further, the process described herein enables the hypervisor, or other software on the platform, to ensure that control that is transferred to the hypervisor is done in a secure manner. That is, the system may execute one or more instructions that will put the system into a known "good" state when control is passed to the hypervisor.

These and other examples will be described in more detail below with respect to FIG. 1-FIG. 4B.

Figure 1:
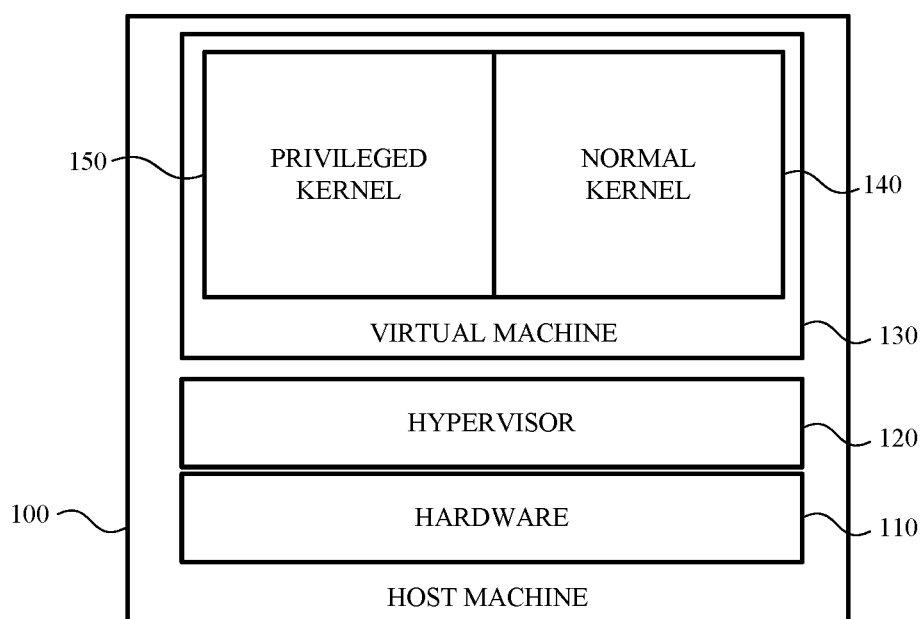
FIG. 1 illustrates an example host machine on which a hypervisor may be securely launched according to an example.

FIG. 1 illustrates an example host machine 100 on which a hypervisor 120 may be securely launched according to an example. In some implementations, the host machine 100 may be any computing device capable of launching one or more virtual machines, such as, for example, virtual machine 130. The host machine 100 may be a desktop computer, a laptop computer, a mobile computing device, a tablet computing device, a wearable computing device, a gaming device and so on.

As shown in FIG. 1, the host machine 100 may include hardware 110. The hardware 110 may include one or more processors, one or more storage devices, one or more memory devices and so on.

In the example shown in FIG. 1, the host machine 100 also includes a hypervisor 120. In some cases, the hypervisor 120 may be software, hardware, firmware or a combination thereof. As will be explained in more detail below, the hypervisor 120 is configured to create, run and/or manage one or more virtual machines 130.

Because the hypervisor 120 is configured to create, run and/or manage one or more virtual machines, the host machine 100 may want to ensure that the hypervisor 120 will be launched securely. The host machine 100 may also want a way to ensure that the integrity of the hypervisor 120 remains intact and that the secure launch process was executed correctly.

The process of securely launching a hypervisor may begin when the host machine 100 boots up. During the boot process, one or more boot components of the host machine 100 may load the hypervisor 120 from a storage location of a storage device associated with the host machine 100. In some instances, the UEFI code base may be used to initiate the process but it may not be the only component relied on to securely load code that launches the hypervisor 120. In other instances, the hypervisor 120 may be launched without using the UEFI code base.

Although the hypervisor 120 has been loaded, the hypervisor 120 may still be in an untrusted or unverified state. As such, the host machine 100 (via the hardware 110 or other software and/or firmware associated with the host machine 100) may issue one or more commands that initiate the secure launch process. The secure launch process validates the components that eventually launch the hypervisor 120 such that the host system 100 knows that these components are operating in a good state.

For example, the host system 100 may have access to code (e.g., binary code) or other such secure instructions that is used to securely launch or otherwise verify the integrity of the hypervisor 120. In some instances, this code may be securely stored or otherwise be a part of the hardware 110. In other implementations, this code may be securely stored in a storage device associated with the host machine 100. Regardless of where the code is stored, the host system 100 may be required to validate the integrity of the code before it is executed. In some cases, the verification process includes verifying or validating security credentials associated with the code. In some instances, the security credentials may be a signature, a certificate or other such security credential. Although specific verification processes are described, other verification processes may be used.

Verification of the code helps the host system 100 ensure that a boot processor associated with the hardware 110 is active and is the only processor that will be used to launch the hypervisor 120. As such, the host machine 100 may be able to determine that other processors aren't active and executing malicious code when the hypervisor 120 is being launched. Additionally, verification of the code may be used to ensure that other components of the host machine 100 weren't able to access the storage location of the code and overwrite it with malicious code or otherwise tamper with the code.

Once the host system 100 verifies the integrity of the code (e.g., the code has been signed), the hardware 110 may execute the code and start the hypervisor 120. In some instances, the code may be required to execute in a defined sequence. The defined sequence may only be known to the hardware and/or the hypervisor. As such, when the hypervisor and/or hardware subsequently determines whether the hypervisor was securely launched, the verification process may include verification that the sequence of steps were followed.

Additionally, the code may be configured to pull additional code (e.g., binary code) from other secure storage locations within the host machine. In such instances, the additional code may be verified in a similar manner as was described above and may also be required to execute in a defined sequence. As such, a determination of whether the additional code was executed in the defined sequence may also be used to verify the integrity of the hypervisor and whether it was securely launched.

In some instances, the storage locations may be protected or otherwise secured such that only certain trusted components of the host machine 100 know where this code is stored and have access to it. For example, in some implementations, the locations of the additional code may only be determined once the original code has been verified and the hardware 110 has begun executing the original code.

Once the process above has been completed and the hypervisor 120 has been securely launched, the host machine 100 may want to verify that the hypervisor 120 was securely launched and/or verify that the hypervisor 120 is still operating in a good and known state. In some cases, this verification process may enable the hypervisor 120 to unlock various secrets stored by the host machine 100 and/or perform other actions on behalf of the host machine 100.

In some instances, the verification process includes the use of a trusted platform module. The trusted platform module may be part of the hardware 110. In some cases, the trusted platform module may be used to store a decryption key (or secret information) that may be used by the hypervisor 120 to access additional secrets or stored information on the host machine 100. However, the trusted platform module may be configured to only release this information when certain measurements have been met. For example, the trusted platform module may need verification that the secure launch process described above has been successfully executed. In some instances, the verification that the secure launch process has occurred may come from a component other than the hypervisor 120. For example, the hardware 110 (or a software component) may be configured to provide verification to the trusted platform module that the secure launch process has been successfully completed. If the secure launch process has not occurred, the trusted platform module may prohibit any component from accessing the decryption key. Although the secure launch process is specifically mentioned as an expected measurement, other measurements may also be required.

In some instances, the measurements that the trusted platform module is expecting may be provisioned at the time the trusted platform module was manufactured. In other instances, the measurements may be programmatically provided to the trusted platform module.

Once the hypervisor 120 has been securely launched, the hypervisor 120 may be configured to communicate directly with the hardware 110 of the host machine 100. In such cases, the hypervisor 120 may be viewed as having the highest privilege level among the various other software, firmware and/or other hardware components of the host machine 100. Thus, for example, when the host machine 100 boots up, the hypervisor 120 may be the first item or component that is created, instantiated or otherwise executed on the host machine 100 as a result of the secure launch process.

The hypervisor 120 may create one or more virtual machines 130. Each virtual machine 130 may emulate a computer system and, as such, may provide the functionality of a physical computing device. In some examples, the virtual machine 130 may include a privileged kernel 150 and a normal kernel 140.

The privileged kernel 150 may be configured to execute a secure operating system. As such, the privileged kernel 150 can run one or more secure programs that contain various secretes utilized by the virtual machine 130, the hypervisor 120, and/or the normal kernel 140. For example, the privileged kernel 150 may store various credentials, encryption keys and the like.

The normal kernel 140 may be configured to execute various "normal" programs and applications, such as, for example, word processing applications, browser applications, spreadsheet applications and so on. However, due to the less secure security configuration (e.g., when compared to the security configuration of the privileged kernel 150) of the normal kernel 140, the normal kernel 140 may not store any credentials, encryption keys, or other secrets that may be utilized by the virtual machine 130 and/or the hypervisor 120. As such, when various secrets are needed by the various applications running on the normal kernel 140, the normal kernel 140 may request those secrets from the privileged kernel 150. In another implementation, the normal kernel 140 may request that the privileged kernel 150 perform one or more actions, using one or more of the stored secrets, on behalf of the normal kernel 140 and/or one or more applications executing on the normal kernel.

In some instances and due to the hypervisor 120 allowing the virtual machine to execute both the privileged kernel 150 and the normal kernel 140, the hypervisor 120 may execute, or may cause the virtual machine 130 to execute, in a privileged context. The privileged context enables the hypervisor 120 to switch between the privileged kernel 150 and the normal kernel 140 and/or various user modes.

As the hypervisor 120 is responsible for various virtual machines 130 and each virtual machine's respective kernels, it is important that the hypervisor 120 be one of the most, if not the most secure component on the host machine 100. For example, if the hypervisor 120 is software, the hypervisor 120 may have the highest privilege level when compared to other software that may be executing on the host machine 100. In some cases, the hardware 110 provides the hypervisor 120 with privilege level architecture that enables the hypervisor 120 to run and to exert authority over every virtual machine 130 the hypervisor 120 creates.

As will be explained in more detail below with respect to FIG. 3, the host machine 100 may include nested hypervisors. In such cases, the primary hypervisor may have authority over the secondary hypervisor. Additionally, each hypervisor may be required to undergo a secure launch process such as described above. Additionally, each hypervisor may be required to verify to the other hypervisors (or provide verification to the hardware 110 or other component of the host machine 100) that it was securely launched. For example, a "parent" hypervisor may be required to verify that it has been securely launched to a "child" hypervisor or vice versa. In other example, the hypervisor 120 may be required to provide verification to the hardware 110 that is was securely launched prior to the hypervisor 120 creating any children hypervisors.

Figure 2:
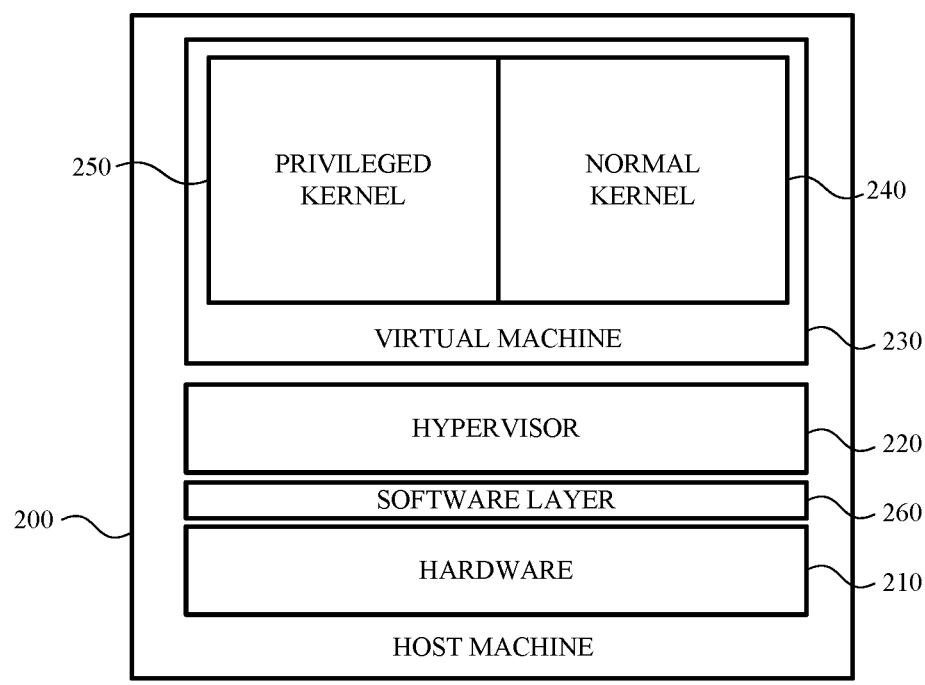
FIG. 2 illustrates another example host machine on which a software layer exists between the hypervisor and the hardware of the host machine according to an example.

FIG. 2 illustrates another example host machine 200 on which a software layer 260 exists between the hypervisor 220 and the hardware 210 of the host machine 200 according to an example. In this example, the hardware 210, the hypervisor 220 and virtual machine 230, the normal kernel 240 and the privileged kernel 250 may function in a similar manner such as was described above with respect to FIG. 1. However, in this example, the host machine 200 includes a software layer 260 positioned between the hypervisor 220 and the hardware 210.

In some cases, the software layer 260 may be responsible for certain aspects of the hardware 210. For example, the software layer 260 may be responsible for putting the host machine 200 in a sleep state, resuming programs or applications when the host machine 200 awakens from a sleep state and so on. In other example, the software layer 260 may include code (e.g., binary code) that is used to execute the secure launch process such as described above.

It is also possible that the software layer 260 has a higher privilege level than the hypervisor 220. In such cases, the hypervisor 220 should be configured to communicate directly with the software layer 260. That is, any communication between the software layer 260 and any of the other components (e.g., the privileged kernel 250, the normal kernel 240 etc.) of the host machine 200 should be routed through or otherwise mediated by the hypervisor 220. For example, any communication that occurs between the normal kernel 240 and the software layer 260 should be handled by the hypervisor 220. However, it is also possible that certain communication channels could be allowed directly between lower privilege software and the software layer 260 without each individual message having to go through the hypervisor 220.

In some cases when the software layer 260 is present, it may be desirable for the hypervisor 220 to be able to turn off or deactivate the software layer 260. For example, once the hypervisor 220 has been initialized, the hypervisor 220 may be configured to turn off the software layer 260, suspend operations performed by the software layer 260, intercept commands provided by or sent to the software layer 260 and so on. In this way, the hypervisor 220 may have the highest privilege level within the host machine 200. As such, security features of the host machine 200 may be improved as the hypervisor 220 controls communications between the various components of the host machine 200. As will also be described below, the host machine 200 may be able to determine that the hypervisor 220 was securely launched thereby preventing any attacks that may be brought to the host machine 200.

Figure 3:
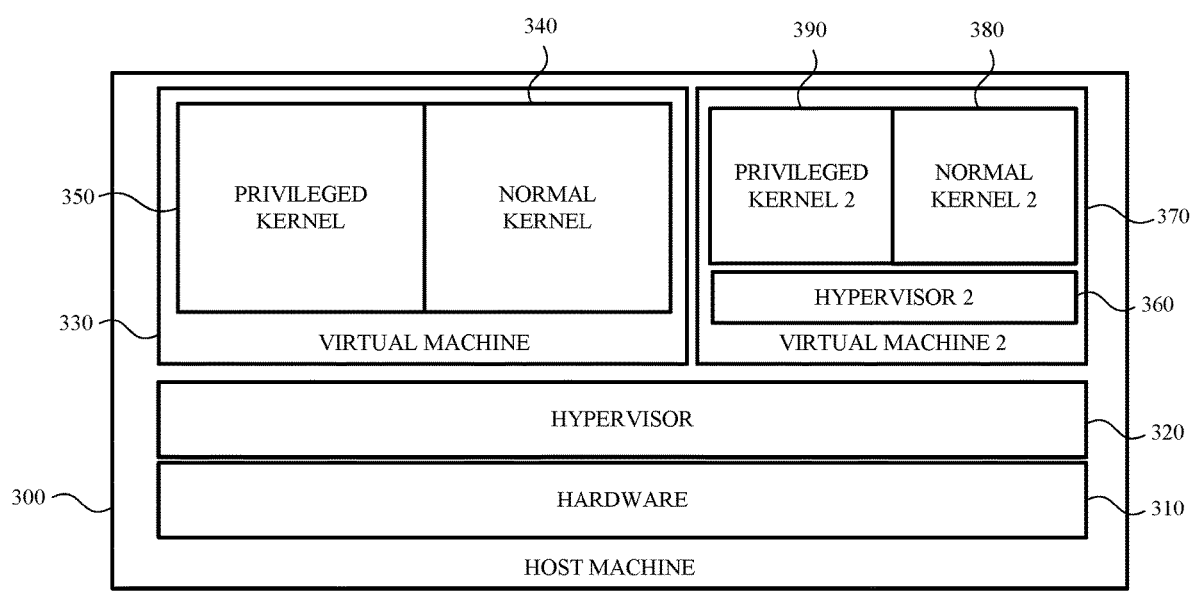
FIG. 3 illustrates an example host machine having nested hypervisors that support nested virtualization according to an example.

FIG. 3 illustrates an example host machine 300 having nested hypervisors that support nested virtualization according to an example. As shown in FIG. 3, the host machine 300 may include hardware 310 and a hypervisor 320. In some cases, the hardware 310 and the hypervisor 320 may function in a similar manner such as described above. For example, the hypervisor 320 may communicate with the hardware 310 as well as with a normal kernel 340 and a privileged kernel 350 of a virtual machine 330.

Additionally, the hypervisor 320, and/or the hardware 310, may be able to create, run, and/or command another hypervisor (shown in FIG. 3 as hypervisor 2 360) and another virtual machine (shown in FIG. 3 as virtual machine 2 370). As with the virtual machine 330, the virtual machine 2 370 may include a privileged kernel (shown in FIG. 3 as privileged kernel 2 390) and a normal kernel (shown in FIG. 3 as normal kernel 2 380). Each of these kernels may function in a similar manner to the normal kernel 140 and the privileged kernel 150 described above.

The hypervisor 2 360 may communicate with and run the privileged kernel 2 390 and the normal kernel 2 380 in a similar manner as described above. For example, the hypervisor 2 360 of the virtual machine 2 370 may run in a privileged context, which enables the hypervisor 2 360 to switch between the privileged kernel 2 390 and the normal kernel 2 380.

The hypervisor 2 360 may believe that it is the only hypervisor in the host machine 300. However, the hypervisor 2 360 may be subject to and commanded by the hypervisor 320. That is, any communications between the hypervisor 2 360 and the hardware 310 may be passed through the hypervisor 320. In some instances, hypervisor 2 360 may be launched using the secure launch process described above. Once launched, the hypervisor 2 360 and/or the hardware 310 may be required to verify that the hypervisor 2 360 was securely launched. In some implementations, the hypervisor 320 may also be required to verify that it was securely launched before it is allowed to create the virtual machine 2 370 and/or the hypervisor 2 360.

Although not shown in FIG. 3, the host machine 300 may also include a software layer, such as, for example, software layer 260 (FIG. 2). When the software layer is present, the hypervisor 2 360 should only be configured to communicate the hypervisor 320. As was described above, the hypervisor 2 360 will not be launched until a verification is received that the hypervisor 320 has been launched securely.

Regardless of the configuration of the host machine, it is imperative that the hypervisor be launched securely. The options to securely launch the hypervisor may differ depending on the configuration of the host machine. In some implementations, the options described below may be performed separately. In other implementations, the options described below are mutually exclusive. In yet other implementations, the options described below may be performed sequentially, simultaneously or substantially simultaneously.

The first option to ensure that the hypervisor is securely launched is to ensure that that the hardware (e.g., hardware 310) launches the hypervisor 320 once the host machine 300 boots. For example, the hardware 310 may have knowledge of where the hypervisor 320 binary is located and may be configured to immediately cause the hypervisor 320 to execute or establish a privilege level for the hypervisor upon booting up. Stated another way, the hypervisor 320, or a secure hypervisor loader associated with the hardware 310, can be authenticated and start executing before any non-secure code is executed. In some cases, the non-secure code may be part of the software layer 260 (FIG. 2).

A second option may be to include or otherwise provide access to a special boot loader. In some cases, the special boot loader may be able to leverage a specialized secure launch mechanism (e.g., an instruction or command) that causes the hardware 310 to launch the hypervisor 320 and ensure the hypervisor 320 is securely executed. In some cases, the second option may be used when the software layer 260 is present in the host machine and/or when a unified extensible firmware interface (UEFI) (or a basic input/output system (BIOS)) is executed prior to the hypervisor being launched.

In some cases, and regardless of which option above is used to launch the hypervisor 320, the hardware 310 may validate that the hypervisor 320 is in a secure state. If not, the hardware 310 may be configured to place the hypervisor 320 in the secure state. Once the hypervisor 320 is in the secure state, the hypervisor 320 may begin creating one or more virtual machines 330.

As discussed above, the hypervisor 320 may be configured to provide (via software and hardware architectural mechanisms) various different privilege levels. For example, the hypervisor 320 may allow the virtual machine 330 to execute in a "privileged" level and a "normal" level or "less privileged" level. Although two specific levels are mentioned, the hypervisor 320 may allow one or more virtual machines to execute in various different privilege levels. Because of this configuration, the hypervisor 310 may be able to switch between the privileged kernel 350 and the normal kernel 340.

When the hypervisor 320 is in the privileged level, various platform details associated with the host machine 300 may be obtained by the hypervisor 320. In some cases, the platform details may be conveyed to the hypervisor 320 using one or more Advanced Configuration and Power Interface (ACPI) tables. In other cases, the hypervisor 320 may be instructed to search or otherwise obtain these platform details from various other software or hardware components associated with the host machine 300.

For example, in some cases, platform details may be hard-coded or discovered via a non-architectural interface. In this example, a highly privileged software module executing on host machine may be responsible for boot-strapping the system and providing these details.

In some cases, the details may include a location of one or more IOMMU that the hypervisor 320 may use to protect itself from direct memory access (DMA) attacks, how to zero some or all of the memory (e.g., on shutdown or reboot), how to power the host machine 300 down, how to reset the host machine 300, what the memory maps look like (e.g., what ranges include the MMIO, RAM, persistent memory, etc.), how to start additional processors, and so on.

Figure 4A:
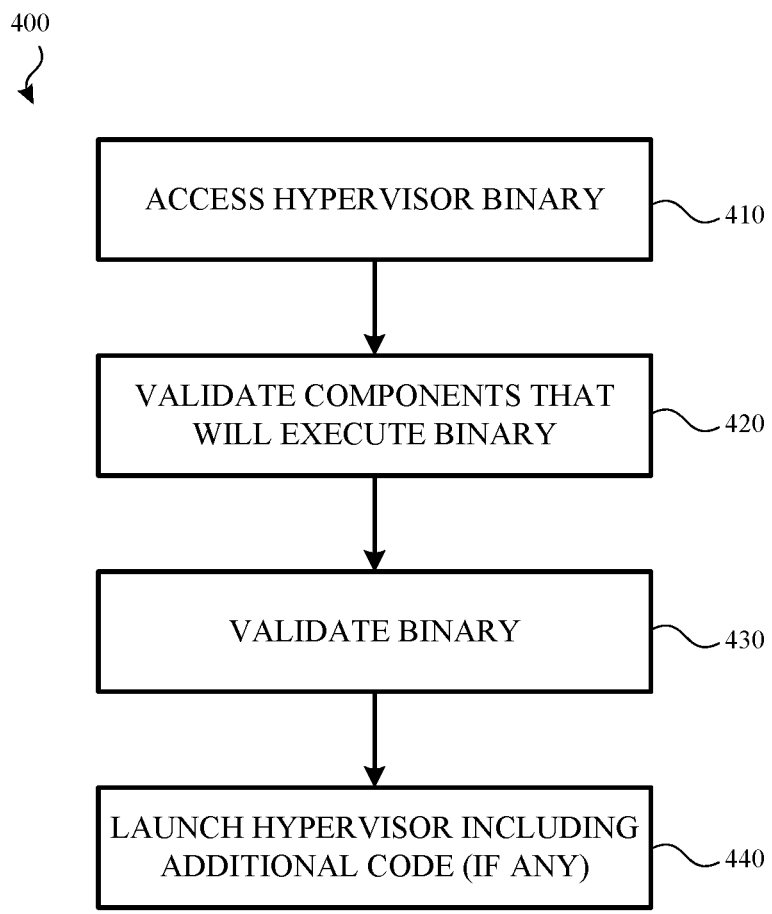
FIG. 4A illustrates a method for securely launching a hypervisor according to an example.

FIG. 4A illustrates a method 400 for securely launching a hypervisor according to an example. In some cases, the method 400 may be used by a host system, such as, for example, host system 100 (FIG. 1), host system 200 (FIG. 2), and/or host system 300 (FIG. 3).

Method 400 begins at operation 410 in which binary code associated with the hypervisor is accessed. In some examples, the binary code may be stored by the host system that launches a hypervisor, such as, for example, hypervisor 120 (FIG. 1). For example, the binary code may be stored in hardware that is used to securely launch the hypervisors. In other example, the binary code may be stored in a storage device, such as, for example, a trusted zone or other storage area of a host machine.

Once the binary code is accessed, flow proceeds to operation 420 and host system validates the components that are configured to execute the binary code associated with the hypervisor. For example, in some cases, a boot processor of the hardware may be the only component that is configured to initially access and execute the binary.

Flow then proceeds to operation 430 and the binary is validated. In some instances, the hardware may be configured to check or validate one or more security credentials (e.g., signatures or certificates) associated with the binary. For example, in some cases, the binary may be created by the manufacturer of the hardware and/or software that is executing on the host system. In such cases, the manufacturer may associate one or more security credentials with the binary that is created at the time of manufacture. These security credentials may need to be validated in order to ensure that the hypervisor is securely launched.

Once the binary has been validated, flow proceeds to operation 440 and the binary is executed and the hypervisor is launched. In some instances, the binary may be configured to pull additional code from other storage locations within the host machine. In such instances, the additional code may be verified in a similar manner as was described above.

In some instances, the storage locations may be protected such that only certain trusted components of the host machine know where the additional code is stored. For example, in some implementations, the locations of the additional code may only be determined once the binary associated with the hypervisor has been verified and the hardware has begun executing the binary.

In some instances, the hardware of the host system may be configured such that the hypervisor is the first component that is launched when the host system boots. In other cases, the host system may include a software layer that is executed once the system boots. In some instances, the binary may be stored in this software layer. Once the software layer executes, the hypervisor may be created and/or execute.

In cases in which a host system has nested hypervisors, each hypervisor may be launched using similar processes. However, in some cases, the root or parent hypervisor may be required to validate or verify that is has been securely launched prior to launching or otherwise causing the host system to execute code that will be used to securely launch a child hypervisor. Once the child hypervisor has been launched, it may also be required to verify that the secure launch process has been successfully executed.

Figure 4B:
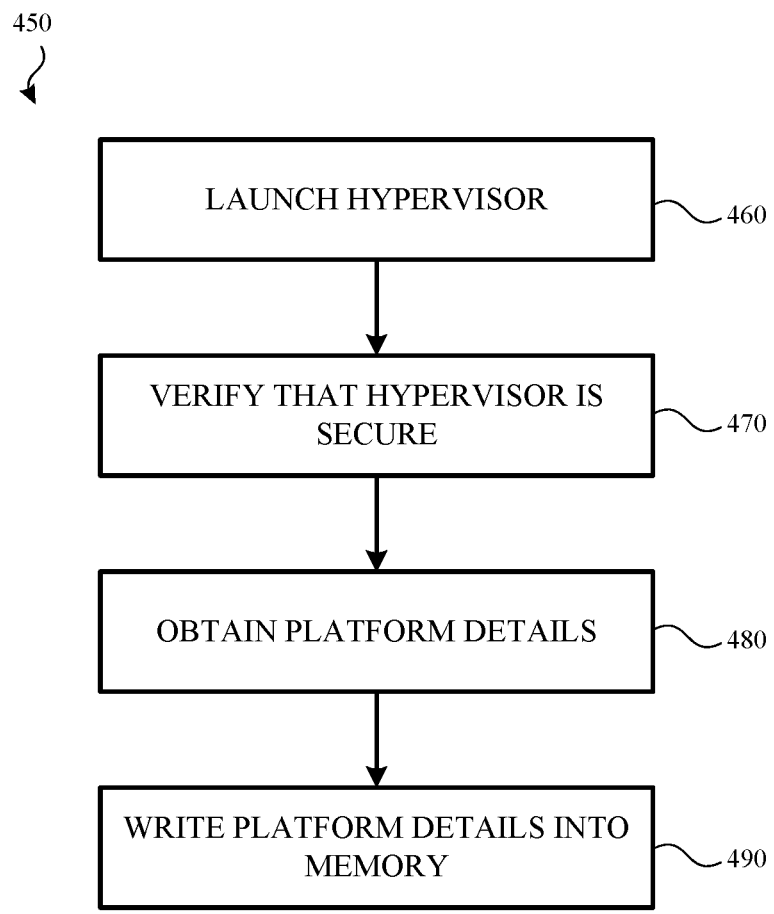
FIG. 4B illustrates a method for verifying that a hypervisor has been securely launched according to an example.

FIG. 4B illustrates a method 450 for validating that a hypervisor was securely launched according to an example. In some instances, the method 450 may be executed by a host system and/or hardware associated with host system once the method 400 shown and described with respect to FIG. 4A has been executed. For example, the hardware of a host machine may utilize the method described below to ensure the hypervisor has been securely launched.

Method 450 begins at operation 460 in which a hypervisor is securely launched such as described above with respect to FIG. 4A. Flow then proceeds to operation 470 in which the hypervisor verifies that it was securely launched. In some cases, the hypervisor may be configured to determine if it was securely launched regardless of whether it was launched when the host system booted up or if it was launched after any software layer that is present in the host machine.

In some instances, the hardware may also be configured to verify that the hypervisor is secure and/or was securely launched. For example, the hardware may provide an attestation to the hypervisor that the hypervisor was securely launched and/or is executing securely. In other cases, the hardware may be configured to determine whether one or more measurements or processes that it expected to be executed were indeed executed. For example, the hardware may be configured to determine whether the secure launch process described above was successfully executed.

In some cases, the hypervisor may be configured to query the hardware (e.g., a chip or a trusted platform module) for a secret (or secrets) that is stored by the hardware. In some cases, the secret may be released when the hypervisor provides proof that an instruction was used to securely launch the hypervisor. If the hypervisor has no knowledge of the instruction and/or cannot otherwise prove that this instruction was used to securely launch the hypervisor, the secret will not be released. If the secret is not released, the hypervisor may be deactivated and instantiated again.

Once the hypervisor has been securely launched and it has been verified, flow proceeds to operation 480 and various platform details are obtained. The platform details may be obtained from an ACPI table. Although an ACPI table is specifically mentioned, the hypervisor may obtain these details in other ways. In some cases, the hypervisor may be required to obtain or validate/verify these details directly from the hardware that is in charge of or otherwise executes these details rather than from other software components as the software components may be less secure. In this way, the hypervisor may know that the information it receives is correct.

Flow then proceeds to operation 490 and the platform details are written into memory and/or into a set of registers. For example, because the hardware and/or the hypervisor knows that the hypervisor has been securely launched, the hypervisor may be permitted to execute various instructions it receives on behalf of the host system.

In some cases, and referring back to FIG. 1, the hardware 110 may include or otherwise be associated with one or more logical processors. Further, each logical processor may be associated with one or more virtual processors. Each logical processor and/or each virtual processor may also be associated with a system register.

The hypervisor 120 may be configured to intercept all system register modifications at per-register granularity. That is, the hypervisor 120 may be able to intercept a single read and/or a single write that is sent to and/or provided from a particular system register. In another implementation, the hypervisor 120 may be configured to intercept a specified number of commands from a specified number of system registers.

In some cases, the hypervisor 120 may have access to or otherwise be associated with a hypervisor system register. In some cases, the hypervisor system register is only available to the hypervisor 120 due to the privilege level of the hypervisor 120. The hypervisor system register may be associated with a bitmap or other structure that is used to store or otherwise identify the location of each system register that is used or accessed by less privileged software (e.g., software that executes in the normal kernel 140).

For example, the bitmap may include entries the each represent a system register. That is, entry 0 in the bitmap may correspond to system register A while entry 1 in the bitmap may correspond to system register B. When a command is issued the hypervisor 120 may choose whether or not to intercept the command.

In another example, the hypervisor 120 may be able to intercept reads and writes separately and choose which commands it wants to intercept. For example, the hypervisor system register may be associated with two different bitmaps or structures with one structure being associated with reads and another structure being associated with writes. Thus, entry 0 in bitmap 1 may correspond to a write intended for system register A, entry 0 in bitmap 2 may correspond to a read intended for system register A, entry 1 in bitmap 1 may correspond to a write intended for system register B, entry 1 in bitmap 2 may correspond to a read intended for system register B and so on.

When a command is issued by the normal kernel 140, the hypervisor 120 may intercept the command, and identify, using the bitmap, the system register the command is intended for. Once the command is intercepted, the hypervisor 120 may be able to determine what additional steps, if any, it should perform.

For example, if a hibernate command is issued by the normal kernel 140, the hypervisor 120 may intercept the command and determine that the host machine 100 is going to enter a hibernation state. In response, the hypervisor 120 may encrypt its memory and/or the memory utilized by the privileged kernel 150. Upon a system resume, the encrypted data may still be secure.

As discussed above, the hypervisor 120 may intercept any number of commands that target any number of system registers. However, the hypervisor 120 is configured to intercept only those commands from only those registers. For example, the hypervisor 120 may intercept three commands intended for three system registers. In another implementation, the hypervisor may intercept two commands intended for two system registers.

In some instances, the hypervisor 120 may be configured to intercept all system power state transitions. This is unlike current intercepts in which a hypervisor intercepts a block of commands for a block of system registers even when the hypervisor is only interested in a single command or system register.

FIG. 5-FIG. 8 and their associated descriptions provide a discussion of a variety of operating environments in which aspects of the disclosure may be practiced. However, the devices and systems illustrated and discussed with respect to FIG. 5-FIG. 8 are for purposes of example and illustration and are not limiting of a vast number of electronic device configurations that may be utilized for practicing aspects of the disclosure, as described herein.

Figure 5:
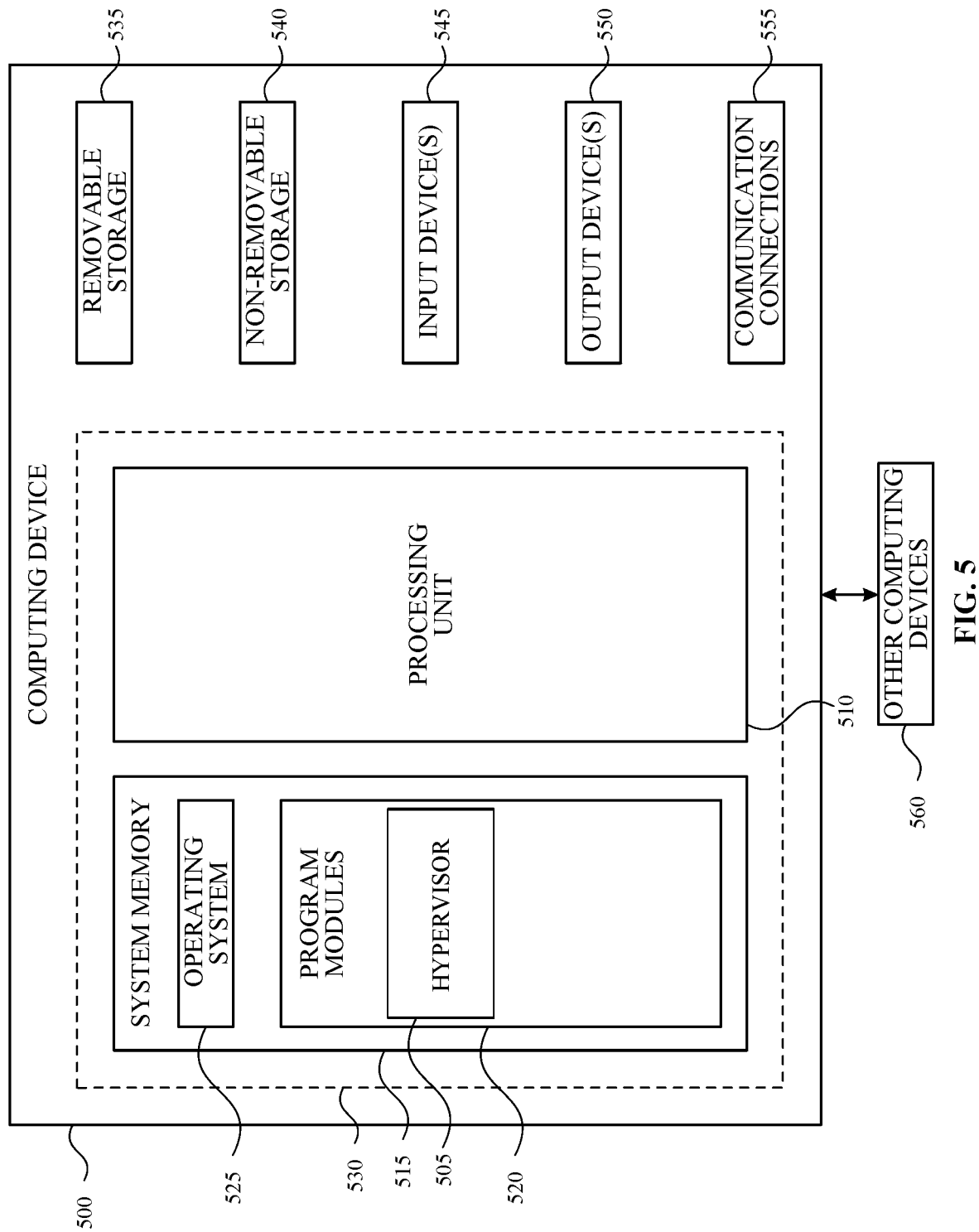
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device 500 may be similar to the host machine 100 described above with respect to FIG. 1.

In a basic configuration, the computing device 500 may include at least one processing unit 510 and a system memory 515. Depending on the configuration and type of computing device 500, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 or components suitable for identifying various objects contained within captured images such as described herein.

The operating system 525, for example, may be suitable for controlling the operation of the computing device 500. Furthermore, examples of the disclosure may be practiced in conjunction with a graphics library, other operating systems, or any other application program and is not limited to any particular application or system. This basic configuration is illustrated in FIG. 5 by those components within a dashed line 530.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., a hypervisor 505) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other computing devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
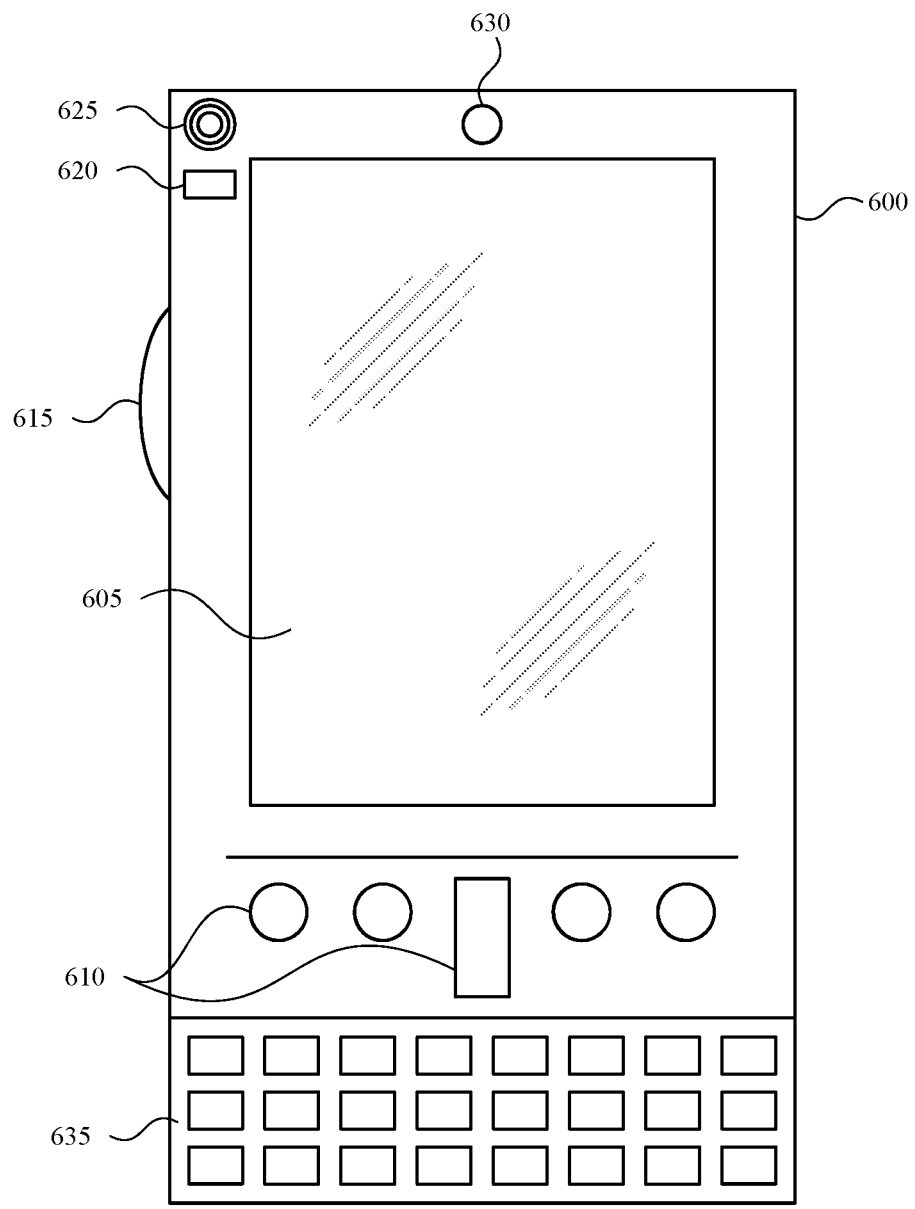
FIGS. 6A and 6B are simplified block diagrams of a mobile computing device with which aspects of the present disclosure may be practiced.
Figure 6B:
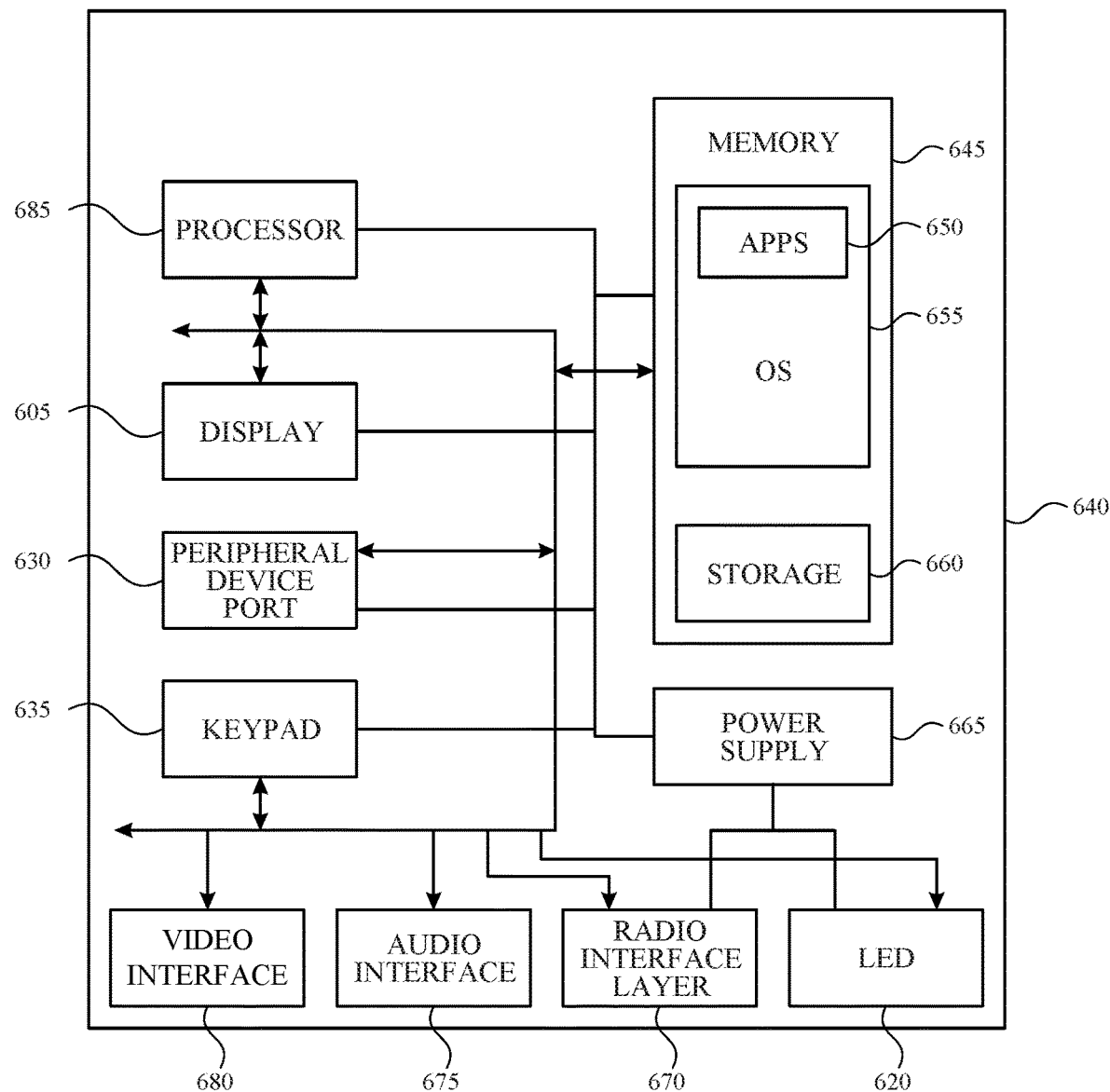

FIG. 6A and FIG. 6B illustrate a mobile computing device 600, for example, a mobile telephone, a smart phone, wearable computer (such as a smart watch), a tablet computer, a laptop computer, and the like, with which examples of the disclosure may be practiced. With reference to FIG. 6A, one aspect of a mobile computing device 600 for implementing the aspects is illustrated.

In a basic configuration, the mobile computing device 600 is a handheld computer having both input elements and output elements. The mobile computing device 600 typically includes a display 605 and one or more input buttons 610 that allow an individual to enter information into the mobile computing device 600. The display 605 of the mobile computing device 600 may also function as an input device (e.g., a display that accepts touch and/or force input).

If included, an optional side input element 615 allows further input. The side input element 615 may be a rotary switch, a button, or any other type of manual input element. In alternative aspects, mobile electronic device 600 may incorporate more or less input elements. For example, the display 605 may not be a touch screen in some examples. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various examples, the output elements include the display 605 for showing a graphical user interface (GUI) (such as the one described above that provides visual representation of a determined pronunciation and may receive feedback or other such input, a visual indicator 620 (e.g., a light emitting diode), and/or an audio transducer 625 (e.g., a speaker). In some aspects, the mobile computing device 600 incorporates a vibration transducer for providing an individual with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device 600. That is, the mobile computing device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the individual takes action to indicate the powered-on status of the device.

The audio interface 675 is used to provide audible signals to and receive audible signals from the individual (e.g., voice input such as described above). For example, in addition to being coupled to the audio transducer 625, the audio interface 675 may also be coupled to a microphone to receive audible input, such as to facilitate a telephone conversation. In accordance with examples of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like.

A mobile computing device 600 implementing the system 640 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile computing device 600 and stored via the system 640 may be stored locally on the mobile computing device 600, as described above, or the data may be stored on any number of storage media that may be accessed by the device via the radio interface layer 670 or via a wired connection between the mobile electronic device 600 and a separate electronic device associated with the mobile computing device 600, for example, a server computer in a distributed computing network, such as the Internet. As should be appreciated such data/information may be accessed via the mobile computing device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIG. 6A and FIG. 6B are described for purposes of illustrating the present methods and systems and is not intended to limit the disclosure to a particular sequence of steps or a particular combination of hardware or software components.

Figure 7:
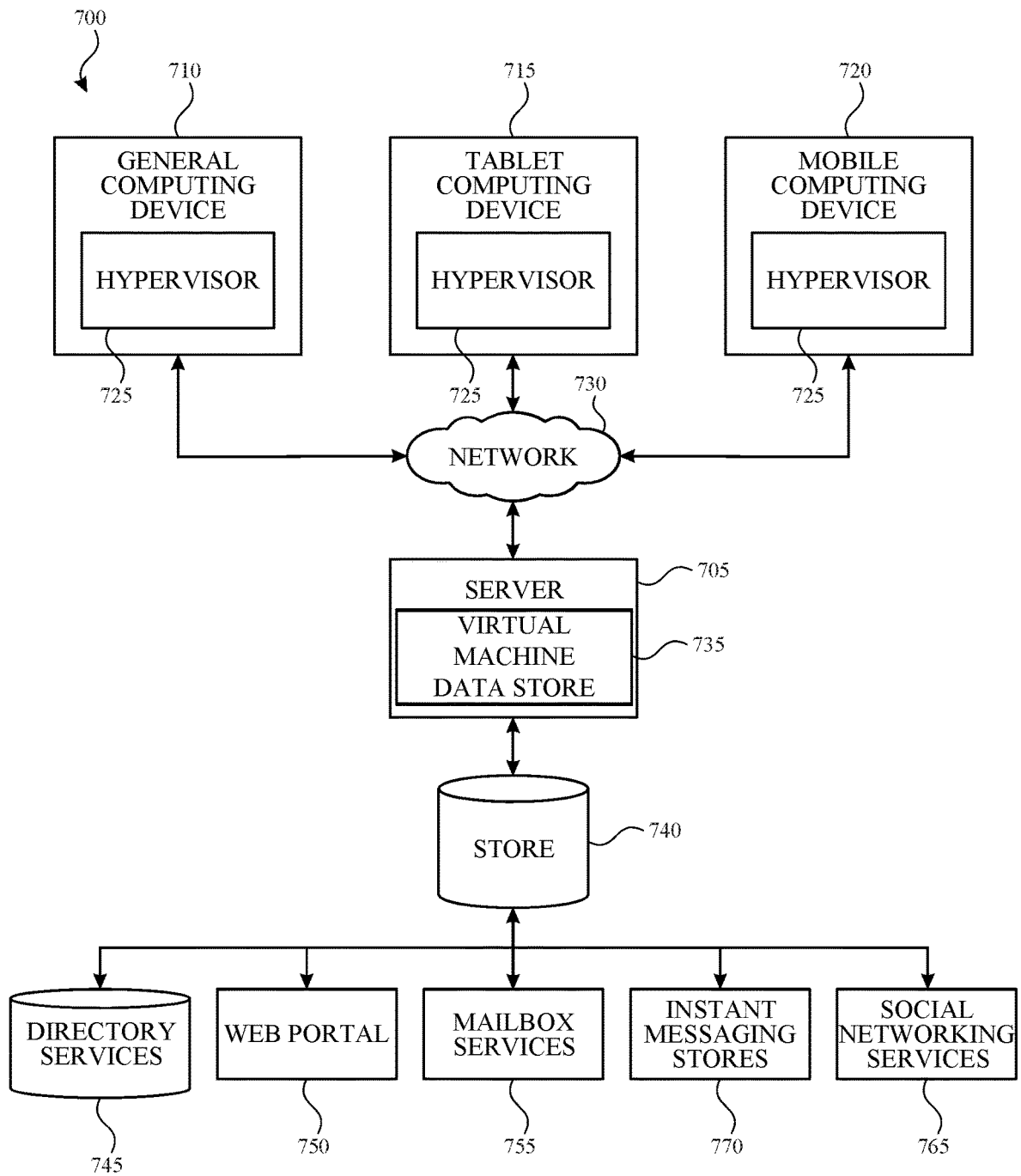
FIG. 7 is a simplified block diagram of a distributed computing system in which aspects of the present disclosure may be practiced.

FIG. 7 illustrates one aspect of the architecture of a system 700 for providing virtualization using a plurality of computing devices. The system 700 may include a general computing device 710 (e.g., personal computer), tablet computing device 715, or mobile computing device 720, as described above. Each of these devices may include a hypervisor 725 such as described herein.

In some aspects, each of the general computing device 710 (e.g., personal computer), tablet computing device 715, or mobile computing device 720 may receive various other types of information or content that is stored by or transmitted from a directory service 745, a web portal 750, mailbox services 755, instant messaging stores 760, or social networking services 765.

In aspects, and as described above, each computing device may have access to a virtual machine data store 735 that is provided on a server 705, the cloud or some other remote computing device.

By way of example, the aspects described above may be embodied in a general computing device 710, a tablet computing device 715 and/or a mobile computing device 720. Any of these examples of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
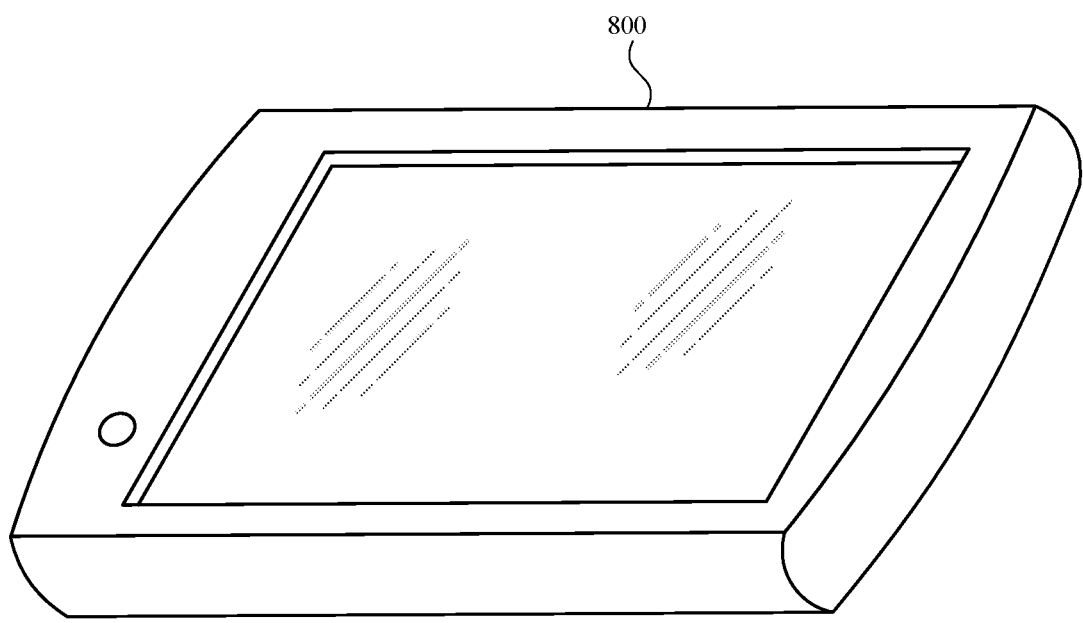
FIG. 8 illustrates a tablet computing device for executing one or more aspects of the present disclosure.

FIG. 8 illustrates an example tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting gestures for controlling the functionality of the electronic device, and the like.

As should be appreciated, the figures herein FIG. 8 is described for purposes of illustrating the present methods and systems and is not intended to limit the disclosure to a particular sequence of steps or a particular combination of hardware or software components.

The present application describes a method, comprising: initializing a hypervisor; performing a verification operation to ensure the hypervisor was initialized securely; when it is determined that the hypervisor was initialized securely, obtaining one or more platform details; and storing the platform details in a memory device. In some examples, the hypervisor provides two or more execution environments for a virtual machine. In some examples, the verification operation includes providing access to a secret that is stored on a hardware device, wherein the access is provided only when the hypervisor is aware of and is able to prove to hardware that secure instructions were used to launch the hypervisor. In some examples, the secure instructions are stored on a hardware device and are to be executed in a defined sequence. In some examples, the secure instructions are stored in a memory device. In some examples, the hypervisor is initialized before one or more other software components. In some examples, the method also includes providing the verification to a nested hypervisor.

Also described is a method for securely launching a hypervisor, comprising: accessing binary code associated with a hypervisor; validating at least one security credential associated with the binary code, wherein the security credential is specified by a manufacturer of the binary code; and when the binary code has been validated, executing the binary code to launch the hypervisor. In some examples, the binary code does not include a Unified Extensible Firmware Interface code base. In some examples, the method also includes validating one or more hardware components that will execute the binary code. In some examples, the one or more hardware components is a boot processor. In some examples, the method also includes providing access to additional code that is used to launch the hypervisor. In some examples, the additional code is stored in a separate storage location from the binary code. In some examples, the security credential is a signature. In some examples, the method also includes validating that the hypervisor was securely launched.

Also described is a system, comprising: at least one processor; and a memory coupled to the at least one processor and storing instructions that, when executed by the at least one processor, perform a method for validating that a hypervisor has been securely launched, comprising: storing a decryption key in a secure memory location; providing verification that one or more expected measurements have been met during a hypervisor launch process; and when it is determined that the one or more expected measurements have been met, enabling access to the decryption key. In some examples, the measurements are specified by a manufacturer of one or more components of the system. In some examples, the memory also stores instructions for generating a nested hypervisor when it is determined that the one or more expected measurements have been met. In some examples, the secure memory location is a trusted platform module. In some examples, the memory also stores instructions for reinitializing the hypervisor when it is determined that at least one of the one or more measurements have not been met.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for securely launching a hypervisor, comprising:
   accessing a set of instructions that are used to launch a hypervisor;
   validating the set of instructions that are used to launch the hypervisor based at least in part on a security credential associated with the set of instructions, wherein the security credential is specified by a manufacturer of the set of instructions or the hypervisor;
   when the set of instructions has been validated, executing the set of instructions to launch the hypervisor;
   determining, after the hypervisor is launched, whether the set of instructions caused the hypervisor to be securely launched by processing the set of instructions used to launch the hypervisor; and
   based on determining the hypervisor was securely launched according to the set of instructions, permitting access by the hypervisor to one or more platform details.

2. The method of claim 1, wherein the set of instructions are binary code.

3. The method of claim 1, further comprising validating one or more hardware components that will execute the set of instructions.

4. The method of claim 3, wherein the one or more hardware components is a boot processor.

5. The method of claim 1, further comprising providing access to additional instructions that are used to launch the hypervisor.

6. The method of claim 5, wherein the additional instructions are stored in a separate storage location from the set of instructions.

7. The method of claim 1, wherein the security credential is a signature.

8. A system, comprising:
   at least one processor; and
   a memory coupled to the at least one processor and storing instructions that, when executed by the at least one processor, perform operations, comprising:
      accessing a set of securely stored instructions that define a process for securely launching a hypervisor;
      validating the set of securely stored instructions that define a process for securely launching the hypervisor based at least in part on a security credential associated with the set of securely stored instructions, wherein the security credential is specified by a manufacturer of the set of securely stored instructions or the hypervisor; and
      when the set of securely stored instructions has been validated, executing the set of securely stored instructions to securely launch the hypervisor;
      determining, after the hypervisor is launched, whether the set of instructions caused the hypervisor to be securely launched by processing the set of instructions used to launch the hypervisor; and
      based on determining the hypervisor was securely launched according to the set of instructions, permitting access by the hypervisor to one or more platform details.

9. The system of claim 8, wherein the set of instructions are binary code.

10. The system of claim 8, further comprising instructions for validating one or more hardware components that will execute the set of securely stored instructions.

11. The system of claim 10, wherein the one or more hardware components is a boot processor.

12. The system of claim 8, further comprising instructions for providing access to additional instructions that are used to securely launch the hypervisor.

13. The system of claim 12, wherein the additional instructions are stored in a separate storage location from the set of instructions.

14. The system of claim 8, wherein the security credential is a signature.

15. A method, comprising:
   storing a set of instructions in a secure memory location, wherein the set of instructions are instructions to launch a hypervisor;
   providing a security credential that enables access to the set of instructions;
   validating the security credential to enable access to the set of instructions; and
   executing the set of instructions to cause execution of the hypervisor;
   determining, after execution of the hypervisor, whether the hypervisor was executed securely by processing the set of instructions used to cause execution of the hypervisor; and based on determining the hypervisor was executed securely according to the set of instructions, permitting access by the hypervisor to one or more platform details.

16. The method of claim 15, wherein the security credential is specified by a manufacturer of the hypervisor.

17. The method of claim 15, further comprising generating a nested hypervisor when the security credential has been validated.

18. The method of claim 15, further comprising reinitializing the hypervisor when it is determined that the security credential was not validated.

19. The method of claim 15, further comprising validating one or more hardware components that will execute the set of instructions.

20. The method of claim 19, the one or more hardware components is a boot processor.

* * * * *